UNITED STATES PATENT OFFICE.

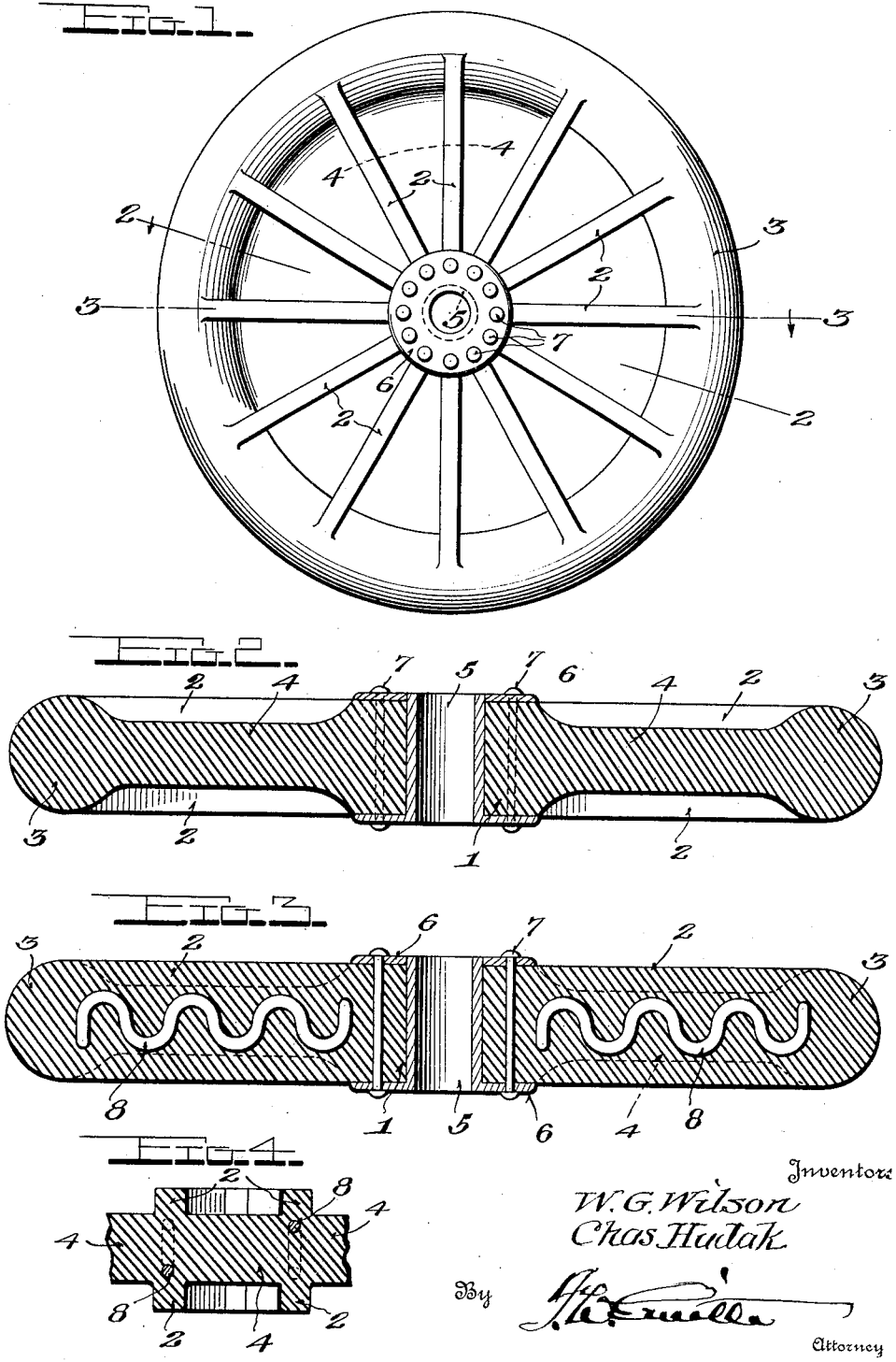

WILLIAM G. WILSON AND CHARLES HUDAK, OF BRIDGEPORT, CONNECTICUT.

VEHICLE-WHEEL.

1,386,389.  Specification of Letters Patent.  Patented Aug. 2, 1921.

Application filed March 24, 1921. Serial No. 455,028.

*To all whom it may concern:*

Be it known that we, WILLIAM G. WILSON and CHARLES HUDAK, citizens, respectively, of the United States and of Czechoslovakia, and both residing at the city of Bridgeport, in the county of Fairfield and State of Connecticut, U. S. A., have invented certain new and useful Improvements in Vehicle-Wheels; and we do declare the following to be a full, clear, and exact description of the invention, such as will enable others skilled in the art to which it appertains to make and use the same.

This invention relates to certain new and useful improvements in automobile wheels, and the primary object thereof is to produce a wheel which is formed of an integral rubber mass both as to its tread and spokes, as well as hub, to thereby provide a wheel which has increased shock absorbing properties, one of light weight, and one which is practically unbreakable and not subject to any punctures.

A further object of the invention is to provide a wheel in which the spokes are connected and reinforced by intervening webs, which latter bridge the entire space between adjacent spokes and the hub and tread.

A still further object of the invention is to provide a rubber wheel with novel spoke reinforcements and with a novel hub construction.

In the drawings:—

Figure 1, is a side elevation of the invention:

Fig. 2, is an enlarged section on line 2—2 of Fig. 1:

Fig. 3, is a section on line 3—3 of Fig. 1, and

Fig. 4 is a section on line 4—4 of Fig. 1.

In proceeding in accordance with the present invention, a wheel is molded of an integral mass of rubber having a hub 1, spokes 2 and a tread 3. The tread 3 is preferably of approximate circular cross-section and the spokes 2 are of the same thickness throughout as the diameter of the tread and of the depth of the hub 1. The spokes are connected by rubber webs 4, which extend throughout the space between the spokes and the space between the tread and the hub. Thus, it will be seen that the tread is connected to the hub by a continuous or solid mass of rubber of appreciable thickness.

The hub is fitted with a steel bushing 5 and has end plates or flanges 6 secured to each other and against the hub ends by bolts 7 which extend through the hub.

Reinforcements 8 composed of sepertine-shaped pieces of wire or rods may be molded in the spokes so as to strengthen the latter, if desired.

The invention not only affords a lighter wheel than a wooden or metal one but also has greater shock-absorbing properties and in addition is practically unbreakable and puncture proof. The wheel further is of increased longevity and is economical especially as to cars of light weight.

If desired or found advisable, the rubber body may be hardened at any point or points, the hardened points and the degree of hardness being determined according to the diameter of the wheel, the weight of the car, or the contemplated usage of the wheel.

From the foregoing it will be apparent that there exists a continuous ring-like body between the hub and the tread, which body is reinforced at spaced points and on opposite sides by a series of pairs of radial and registering spoke-forming parts which extend from the hub beyond the circumference of the ring-like body and merge into the tread of the wheel. Obviously the spokes may be made as wide as desired.

What is claimed is:

1. An automobile wheel composed of an integral rubber structure having a hub, a tread, a continuous ring-like body between the hub and tread, and radial and registering spoke-forming parts arranged in pairs with the parts of each pair disposed on the respective opposite sides of the ring-like body and extending between the hub and tread.

2. An automobile wheel composed of an integral rubber structure having a hub, a tread, a continuous ring-like body between the hub and tread, and spokes arranged in pairs with the spokes of each pair disposed on the respective opposite sides of the body and arranged to register with each other, the spokes having their inner ends connected to the hub and their outer ends extending beyond the circumference of the body and merging into the inner circumference of the tread.

3. An automobile wheel composed of an integral rubber structure having a hub, a tread, a continuous ring-like body between the hub and tread, and spokes arranged in pairs with the spokes of each pair disposed on the respective opposite sides of the body and arranged to register with each other, the spokes having their inner ends connected to the hub and their outer ends extending beyond the circumference of the body and merging into the inner circumference of the tread, said body having radial reinforcements which are formed to have side parts that lie adjacent to the inner side of each of the spoke-forming parts of the pairs of the latter.

In testimony whereof we affix our signatures hereto.

WILLIAM G. WILSON,
CHARLES HUDAK.